(12) United States Patent
Hyodo et al.

(10) Patent No.: US 12,031,299 B2
(45) Date of Patent: Jul. 9, 2024

(54) WORK VEHICLE

(71) Applicant: HITACHI CONSTRUCTION MACHINERY CO., LTD., Tokyo (JP)

(72) Inventors: Koji Hyodo, Kasumigaura (JP); Yasunori Miyamoto, Tsuchiura (JP); Masaki Nukii, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 318 days.

(21) Appl. No.: 17/638,391

(22) PCT Filed: Mar. 8, 2021

(86) PCT No.: PCT/JP2021/009081
§ 371 (c)(1),
(2) Date: Feb. 25, 2022

(87) PCT Pub. No.: WO2021/187206
PCT Pub. Date: Sep. 23, 2021

(65) Prior Publication Data
US 2022/0298753 A1    Sep. 22, 2022

(30) Foreign Application Priority Data
Mar. 17, 2020  (JP) .................... 2020-046377

(51) Int. Cl.
*F16H 59/44*    (2006.01)
*E02F 9/22*     (2006.01)
(Continued)

(52) U.S. Cl.
CPC .......... *E02F 9/2253* (2013.01); *F16H 59/26* (2013.01); *F16H 59/44* (2013.01); *F16H 61/425* (2013.01); *F16H 61/47* (2013.01)

(58) Field of Classification Search
CPC .......... F16H 59/26; F16H 61/47; F16H 59/44; F16H 61/425; F16H 61/4139;
(Continued)

(56) References Cited

U.S. PATENT DOCUMENTS 8,751,114 B2 *   6/2014  Filla ................. F15B 13/14
                                              701/1
10,370,826 B2 *  8/2019  Xing ................ B60W 30/1886
(Continued)

FOREIGN PATENT DOCUMENTS

| JP | 11264465 A   | 9/1999 |
| JP | 2009030693 A | 2/2009 |
| JP | 2011169351 A | 9/2011 |

OTHER PUBLICATIONS

Schutle, Control-Oriented Modeling of Hydrostatic Transmissions using Takagi-Sugeno Fuzzy Systems, 2007, IEEE, p. 1-6 (Year: 2007).*

(Continued)

*Primary Examiner* — McDieunel Marc
(74) *Attorney, Agent, or Firm* — MATTINGLY & MALUR, PC (57) ABSTRACT

Provided is a work vehicle capable of attaining a maximum vehicle speed specification value set in advance for each vehicle body even in the case where a device constituting an HST traveling drive system has deteriorated over time. In a wheel loader 1 equipped with an HST traveling drive system, a controller 5 is configured to, in the case where a detection pressure value P is equal to or less than a switching pressure value Ps corresponding to a switching point in the HST motor 42 between a maximum displacement volume qmax and a minimum displacement volume qmin, and a detection vehicle speed value V is less than an upper limit vehicle speed specification value Vmaxs, limit the minimum displacement volume qmin of the HST motor 42 to a first (Continued)

minimum displacement volume value $qmin1$ less than a minimum displacement volume specification value $qmins$ that is associated with the upper limit vehicle speed specification value $Vmaxs$.

4 Claims, 7 Drawing Sheets

(51) Int. Cl.
  *F16H 59/26* (2006.01)
  *F16H 61/425* (2010.01)
  *F16H 61/47* (2010.01)

(58) Field of Classification Search
  CPC ............ F16H 2059/6861; E02F 9/2253; E02F 9/2203; E02F 9/2235; E02F 9/2012; B60Y 2200/415; F15B 13/026; F15B 21/087; F15B 11/165; F15B 11/161; F15B 21/082; F15B 2211/6346; F15B 2211/20546; F15B 2211/405; F15B 2211/6054; F15B 2211/6658; F15B 2211/327; F15B 2211/3111; F15B 2211/6652; F15B 2211/6313; F15B 2211/3057; F15B 2211/426; F15B 2211/20553
  See application file for complete search history.

(56) References Cited

U.S. PATENT DOCUMENTS

| | | | | |
|---|---|---|---|---|
| 10,801,183 | B2* | 10/2020 | Takeda | F04B 17/03 |
| 10,895,062 | B2* | 1/2021 | Hyodo | E02F 3/43 |
| 10,920,399 | B2* | 2/2021 | Oasa | F16H 61/47 |
| 11,035,462 | B2* | 6/2021 | Oasa | F16H 61/47 |
| 11,242,672 | B2* | 2/2022 | Hyodo | E02F 9/20 |
| 11,326,324 | B2* | 5/2022 | Oasa | E02F 9/2253 |
| 11,891,781 | B2* | 2/2024 | Hyodo | E02F 9/2296 |
| 2021/0012163 | A1* | 1/2021 | Li | G06V 20/56 |
| 2021/0189690 | A1* | 6/2021 | Hyodo | E02F 9/2289 |

OTHER PUBLICATIONS

Zhang et al., Research on straight driving strategy of tracked vehicle equipped with hydrostatic transmission, 2017, IEEE, p. 172-176 (Year: 2017).*

Zhou et al., Modelling and Control of a Novel Hydraulic Hybrid Vehicle with Wheel Motors, 2018, IEEE, p. 1985-1990 (Year: 2018).*

Niu et al., Design and Analysis of an Electric Hydraulic Hybrid Powertrain in Electric Vehicles, 2017, IEEE, p. 48-57 (Year: 2017).*

International Search Report of PCT/JP2021/009081 dated May 11, 2021.

* cited by examiner

WORK VEHICLE

TECHNICAL FIELD

The present invention relates to a work vehicle equipped with a traveling drive system which employs a continuously variable transmission.

BACKGROUND ART

There has been known a work vehicle such as a wheel loader, a wheel excavator, and a tractor, which is provided with, as a traveling drive system employing a continuously variable transmission, an HST (Hydraulic Static Transmission) traveling drive system. In the HST traveling drive system, an engine drives a hydraulic pump to generate hydraulic pressure, and a hydraulic motor converts the generated hydraulic pressure to a rotational force.

For example, Patent Literature 1 discloses a wheel loader comprising an engine, a traveling hydraulic pump driven by the engine, a traveling hydraulic motor driven by the hydraulic oil discharged from the traveling hydraulic pump, tires to which a rotational driving force is applied by the traveling hydraulic motor, a vehicle body controller for controlling the capacity of the traveling hydraulic motor. In the case of the wheel loader according to Patent Literature 1, the vehicle body controller reduces the minimum capacity of the traveling hydraulic motor in response to decrease in the engine rotational speed, whereby the wheel loader can travel at the maximum vehicle speed even without requiring a driver to step on an accelerator pedal to the maximum. In this way, the wheel loader according to Patent Literature 1 suppresses a step-on amount of the accelerator pedal so as to improve fuel efficiency during, for example, traveling at high speed.

CITATION LIST

Patent Literature

Patent Literature 1: JP-A-2011-169351

SUMMARY OF INVENTION

Technical Problem

However, in the case of the wheel loader according to Patent Literature 1, the volumetric efficiency is reduced due to deterioration over time of the traveling hydraulic pump and the traveling hydraulic motor, and also, variation in the displacement volume of the traveling hydraulic motor occurs due to wear of a motor cylinder (regulator portion) of the traveling hydraulic motor although the vehicle body controller outputs the same command current. In such a case, the wheel loader cannot travel at the maximum vehicle speed in accordance with a command from the vehicle body controller, and thus may not attain the vehicle speed set in advance as a specification value of the maximum vehicle speed of the vehicle body.

Therefore, an object of the present invention is to provide a work vehicle capable of attaining a maximum vehicle speed specification value set in advance for each vehicle body even in the case where a device constituting an HST traveling drive system has deteriorated over time.

Solution to Problem

In order to achieve the object above, the present invention provides a work vehicle comprising: a vehicle body that is provided with a plurality of wheels; an engine that is mounted on the vehicle body; a variable displacement traveling hydraulic pump that is driven by the engine; a variable displacement traveling hydraulic motor that is connected to the traveling hydraulic pump through a closed-circuit and transmits a driving force of the engine to the plurality of wheels; and a controller configured to control the traveling hydraulic motor, wherein the work vehicle comprises: a pressure sensor configured to detect a load pressure of the traveling hydraulic motor; and a vehicle speed sensor configured to detect a vehicle speed, and the controller is configured to, in a case where a detection pressure value detected by the pressure sensor is equal to or less than a switching pressure value corresponding to a switching point in the traveling hydraulic motor between a maximum displacement volume and a minimum displacement volume, and the detection vehicle speed value detected by the vehicle speed sensor is less than a predetermined upper limit vehicle speed during flat ground traveling of the vehicle body, limit the minimum displacement volume of the traveling hydraulic motor to a first minimum displacement volume value that is less than a value of the minimum displacement volume of the traveling hydraulic motor which is associated with the upper limit vehicle speed.

Advantageous Effects of Invention

According to the present invention, it is possible to attain a maximum vehicle speed specification value set in advance for each vehicle body even in the case where a device constituting an HST traveling drive system has deteriorated over time. The problems, configurations, and advantageous effects other than those described above will be clarified by explanation of an embodiment below.

DESCRIPTION OF EMBODIMENTS

Hereinafter, as an aspect of work vehicles according to an embodiment of the present invention, for example, a wheel loader for performing loading work by excavating a work object such as earth and sand and minerals and loading the excavated object into such as a dump truck will be described.

<Configuration of wheel loader 1>

Firstly, a configuration of a wheel loader 1 will be described with reference to FIG. 1.

Figure 1:
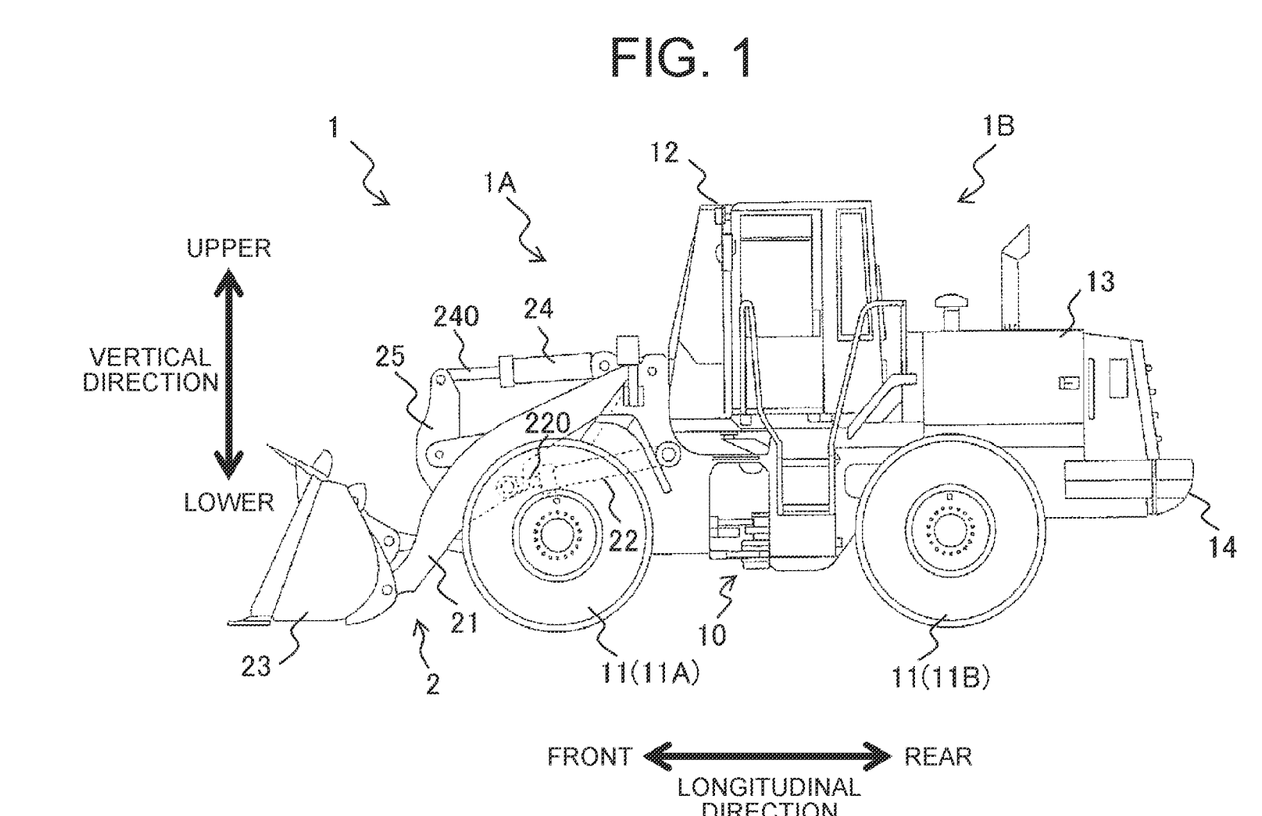
FIG. 1 is a side view of an appearance illustrating a configuration example of a wheel loader according to an embodiment of the present invention.

FIG. 1 is a side view of an appearance illustrating a configuration example of the wheel loader 1 according to the embodiment of the present invention.

The wheel loader 1 is an articulated type work vehicle which is swiveled on a central portion of the vehicle body and steered thereby. Specifically, a front frame 1A that is the front part of the vehicle body and a rear frame 1B that is the rear part of the vehicle body are connected to each other by a center joint 10 to swivel in the left and right direction so that the front frame 1A is bent in the left and right direction with respect to the rear frame 1B.

The vehicle body includes four wheels 11. Two wheels 11 among them are provided, as front wheels 11A, on the left and right sides of the front frame 1A, respectively, and the remaining two wheels 11 are provided, as rear wheels 11B, on the left and right sides of the rear frame 1B, respectively. FIG. 1 illustrates, among the pair of left and right front wheels 11A and the pair of left and right rear wheels 11B, only the front wheel 11A and the rear wheel 11B provided on the left side. Note that the number of the wheels 11 provided on the vehicle body is not particularly limited.

On a front portion of the front frame 1A, a hydraulically driven loading work device 2 used for the loading work is mounted. The loading work device 2 includes a lift arm 21 whose proximal end portion is attached to the front frame 1A, two lift arm cylinders 22 for driving the lift arm 21 by extension and contraction of each rod 220, a bucket 23 attached to the distal end portion of the lift arm 21, a bucket cylinder 24 for driving the bucket 23 by extension and contraction of a rod 240, and a bell crank 25 rotatably connected to the lift arm 21 and forming a link mechanism between the bucket 23 and the bucket cylinder 24. Although the two lift arm cylinders 22 are arranged side by side in the lateral direction of the vehicle body, FIG. 1 illustrates only one of the lift arm cylinders 22 which is disposed on the left side by a broken line.

When each of the two arm cylinders 22 is supplied with hydraulic oil discharged from a loading hydraulic pump, the lift arm 21 is rotationally moved in the upper direction with respect to the front frame 1A by extension of each rod 220, and is rotationally moved in the lower direction with respect to the front frame 1A by contraction of each rod 220.

The bucket 23 is a work tool for scooping and discharging earth and sand and leveling the ground. When the bucket cylinder 24 is supplied with hydraulic oil discharged from the loading hydraulic pump, the bucket 23 is rotationally moved in the upper direction (tilt) with respect to the lift arm 21 by extension of the rod 240, and is rotationally moved in the lower direction (dump) with respect to the lift arm 21 by contraction of the rod 240.

Note that the bucket 23 can be replaced with various attachments such as a blade, and the wheel loader 1 can perform operations such as snow removing, other than the operations such as excavating and dozing by using the bucket 23.

The rear frame 1B includes an operator's cab 12 provided for an operator to get in, a machine room 13 for accommodating therein respective devices necessary for driving the wheel loader 1, and a counterweight 14 for balancing the vehicle body with the loading work device 2 to prevent the vehicle body from tilting. On the rear frame 1B, the operator's cab 12 is provided in the front thereof, the counterweight 14 is provided in the rear thereof, and the machine room 13 is provided between the operator's cab 12 and the counterweight 14.

<Traveling Drive System of Wheel Loader 1>

Next, a traveling drive system of the wheel loader 1 will be described with reference to FIG. 2 to FIG. 4.

Figure 2:
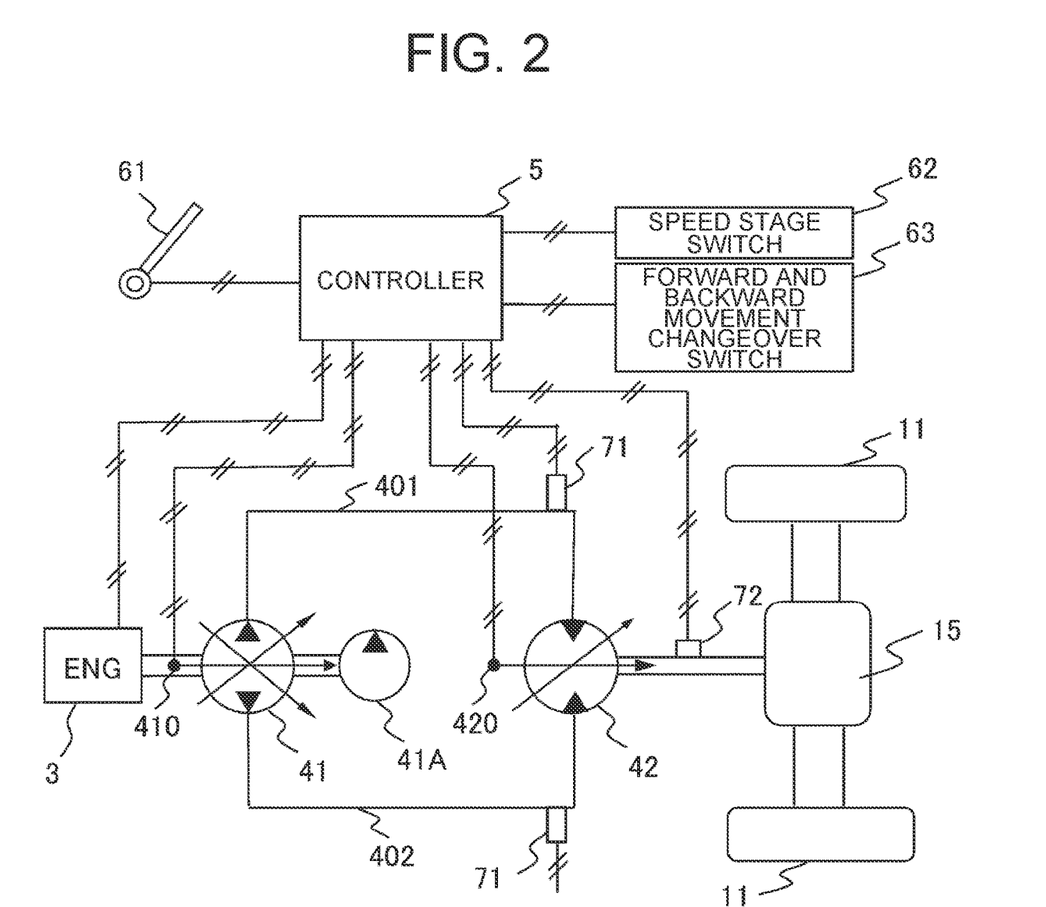
FIG. 2 illustrates a configuration of a traveling drive system of the wheel loader.

FIG. 2 illustrates a configuration of the traveling drive system of the wheel loader 1. FIG. 3 illustrates a graph showing the relation between the vehicle speed V and the HST motor displacement volume q with the lapse of the time t. FIG. 4 illustrates a graph showing the relation between the vehicle speed V and the traction force.

The traveling of the wheel loader 1 is controlled by the HST traveling drive system which enables smooth starting and stopping with little impact. As illustrated in FIG. 2, this HST-type traveling drive system includes an engine 3 mounted on the vehicle body, an HST pump 41 as a traveling hydraulic pump driven by the engine 3, an HST charge pump 41A which supplies hydraulic oil for controlling the HST pump 41, an HST motor 42 as a traveling hydraulic motor connected to the HST pump 41 via a pair of pipes 401, 402 through a closed-circuit, and a controller 5 configured to control each of the devices relating to the traveling drive of the wheel loader 1, such as the engine 3, the HST pump 41, and the HST motor 42.

The HST pump 41 is a swash plate type variable displacement hydraulic pump of which the displacement volume is controlled in accordance with a tilt angle. The tilt angle is adjusted by a pump regulator 410 in accordance with a command signal output from the controller 5.

The HST motor 42 is a swash plate type variable displacement hydraulic motor of which the displacement volume is controlled in accordance with a tilt angle, and transmits the driving force of the engine 3 to the four wheels. In the same manner as the HST pump 41, the tilt angle is adjusted by a motor regulator 420 in accordance with a command signal output from the controller 5.

In the case of the HST traveling drive device, firstly, when the operator steps on an accelerator pedal 61 provided in the operator's cab 12 (see FIG. 1), the engine 3 is rotated, and the HST pump 41 is driven by the driving force of the engine 3. Next, the HST motor 42 is rotated by the hydraulic oil discharged from the HST pump 41. Then, the output torque output from the HST motor 42 is transmitted to the four wheels 11 via an axle 15, thereby causing the wheel loader 1 to travel.

Since the step-on amount of the accelerator pedal 61 is proportional to the rotational speed of the engine 3, the rotational speed of the engine 3 increases as the step-on amount of the accelerator pedal 61 increases. The discharge flow rate Q of the HST pump 41 increases in accordance with increase of the rotational speed of the engine 3, whereby the flow rate of the hydraulic oil flowing from the HST pump 41 into the HST motor 42 increases. Thus, the rotational speed N of the HST motor 42 increases (rotational frequency increases) so as to increase the vehicle speed V. That is, the vehicle speed V is proportional to the rotational speed N of the HST motor 42 (V∝N). The rotational speed N of the HST motor 42 is proportional to the discharge flow rate Q of the HST pump 41 and the volumetric efficiency $\eta$ of the HST motor 42, and is inversely proportional to the displacement volume q of the HST motor 42 ($N = Q \cdot \eta / q$).

Figure 3:
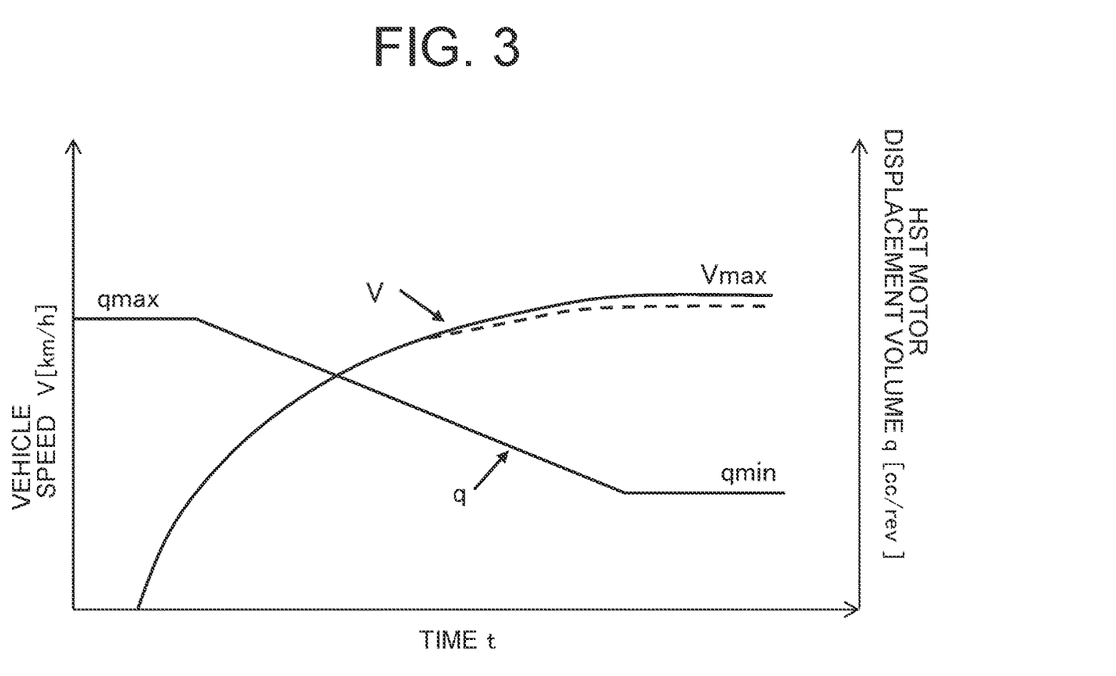
FIG. 3 illustrates a graph showing the relation between the vehicle speed and the HST motor displacement volume with the lapse of time.

While the operator keeps stepping on the accelerator pedal 61, as illustrated in FIG. 3, the vehicle speed V increases toward the maximum vehicle speed Vmax with the lapse of the time t. At this time, the displacement volume q of the HST motor 42 is controlled from the maximum displacement volume qmax toward the minimum displacement volume qmin. Here, the "maximum vehicle speed Vmax" corresponds to the upper limit vehicle speed during the flat ground traveling of the vehicle body, and may be the maximum value of the vehicle speed that the wheel loader 1 can attain, or may be a value arbitrarily set, for example, a value slightly less than the maximum value.

FIG. 3 illustrates a graph indicating a vehicle speed specification value set in advance as the specification of the vehicle speed of the wheel loader 1 by a solid line. In the case where a maximum vehicle speed specification value Vmaxs (=upper limit vehicle speed specification value Vmaxs) is to be attained, the controller 5 outputs, to the motor regulator 420, a command signal according to a minimum displacement volume specification value qmins that is a value of the minimum displacement volume of the HST motor 42 associated with the maximum vehicle speed specification value Vmaxs. The displacement volume q of the HST motor 42 illustrated by the solid line in FIG. 3 is a displacement volume specification value associated with a vehicle speed specification value.

However, for example, in the case where the volumetric efficiency η of the HST motor 42 decreases due to deterioration over time of the HST motor 42 or the influence of hydraulic oil temperature, or in the case where variation in the displacement volume q of the HST motor 42 occurs due to wear of the motor regulator 420, as illustrated by a broken line in FIG. 3, the maximum vehicle speed Vmax that the wheel loader 1 can actually attain becomes less than the maximum vehicle speed specification value Vmaxs (Vmax<Vmaxs).

Note that the vehicle speed V is detected by a vehicle speed sensor 72 mounted to an output shaft of the HST motor 42. Specifically, the vehicle speed sensor 72 is configured to detect the vehicle speed V based on the rotational speed of the HST motor 42, and output the data thereof to the controller 5.

Figure 4:
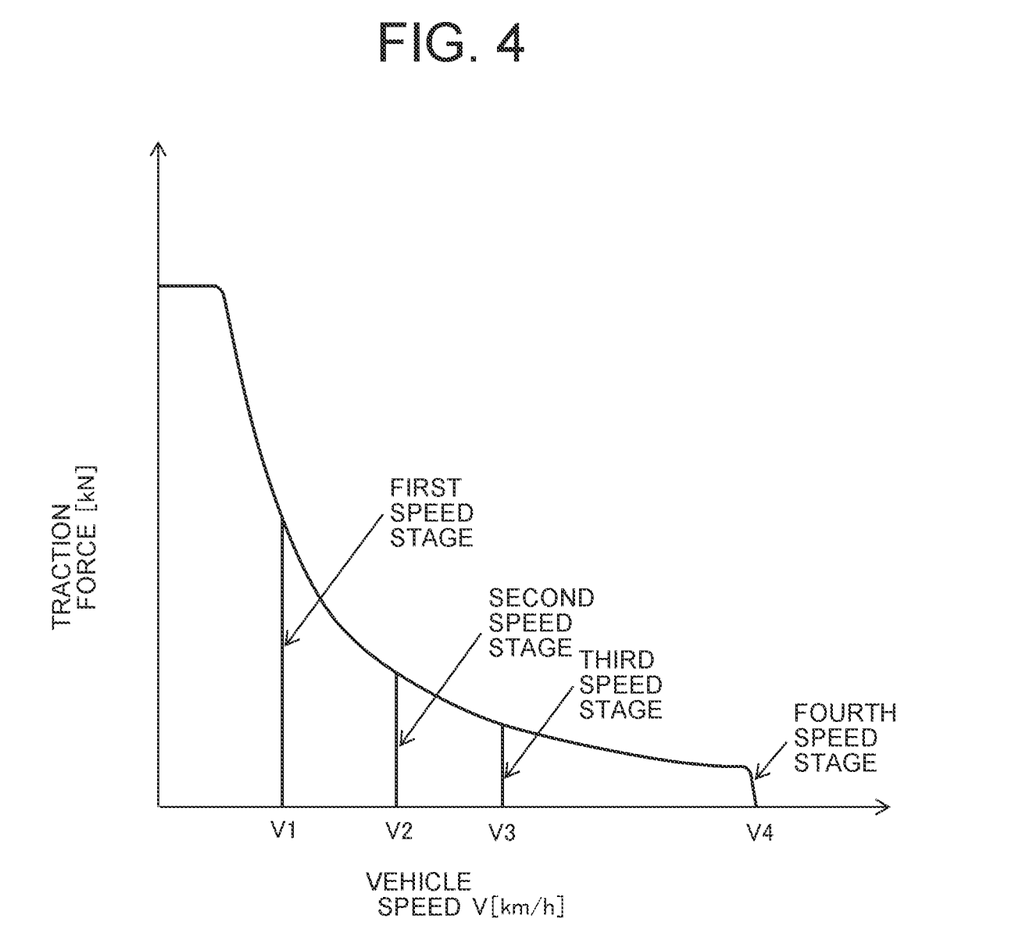
FIG. 4 illustrates a graph showing the relation between the vehicle speed and the traction force.

Furthermore, the wheel loader 1 includes a speed stage switch 62 in the operator's cab 12 (see FIG. 1), which serves as a speed stage selection device for selecting a speed stage of the vehicle body, and as illustrated in FIG. 4, the maximum vehicle speed Vmax is set for each speed stage. In the present embodiment, an operation of the speed stage switch 62 by the operator enables selection of a speed stage from among four speed stages of a first speed stage to a fourth speed stage.

Specifically, the first speed stage is the minimum speed stage of the vehicle body, and is selected for an operation requiring a traction force such as an excavation operation or a climbing operation. The upper limit vehicle speed of the first stage is set to a minimum vehicle speed value V1. The second speed stage is a speed stage that is set one stage higher than the first speed stage, and is selected for an operation such as a dump approach operation. The upper limit vehicle speed of the second speed stage is set to a vehicle speed value V2 that is more than the upper limit vehicle speed value V1 of the first speed stage.

The third speed stage is a speed stage that is set one stage higher than the second speed stage, and the upper limit vehicle speed thereof is set to a vehicle speed value V3 that is more than the upper limit vehicle speed value V2 of the second speed stage. The fourth speed stage is a speed stage that is set one step higher than the third speed stage, and is the maximum speed stage of the vehicle body. The upper limit vehicle speed of the fourth speed stage is set to a vehicle speed value V4 that is more than the upper limit vehicle speed value V3 of the third speed stage. These of the third speed stage and the fourth speed stage correspond to high speed stages that are selected, for example, during hauling load materials, and each of the upper limit vehicle speed values V3, V4 corresponds to the maximum vehicle speed Vmax that is the upper limit vehicle speed during the flat ground traveling of the wheel loader 1.

As illustrated in FIG. 2, a traveling direction of the wheel loader 1, in other words, forward movement or backward movement of the vehicle body is switched by a forward and backward movement changeover switch 63 provided in the operator's cab 12 (see FIG. 1). Specifically, when the forward and backward movement changeover switch 63 is switched to a forward movement position, a switching signal indicating the forward movement is input to the controller 5. Then, the controller 5 outputs, to the HST pump 41, a command signal for causing the HST pump 41 to tilt to a forward movement side. Thus, the hydraulic oil discharged from the HST pump 41 is directed to the HST motor 42 through the pipe 401 which is one of the pair of pipes 401, 402, and the HST motor 42 is rotated in the forward movement direction, thereby causing the vehicle body to move forward.

Similarly, in the case of the backward movement of the vehicle body, when the forward and backward movement changeover switch 63 is switched to a backward movement position, a switching signal indicating the backward movement is input to the controller 5. Then, the controller 5 outputs, to the HST pump 41, a command signal for causing the HST pump 41 to tilt to a backward movement side. Thus, the hydraulic oil discharged from the HST pump 41 is directed to the HST motor 42 through the pipe 402 which is the other one of the pair of pipes 401, 402, and the HST motor 42 is rotated in the backward movement direction, thereby causing the vehicle body to move backward.

The load pressure applied to the HST motor 42 (main pressure of the HST circuit) is detected by a pressure sensor 71 provided on each of the pair of pipes 401, 402, and a detection pressure value P is input to the controller 5.

Note that, under the control by the controller 5, the differential pressure of pressure values P detected by the two pressure sensors 71, respectively, may be used, or a pressure value P detected by the pressure sensor 71 on the high pressure side (specifically, which is a detection pressure value P of the pressure sensor 71 on the side of the one pipe 401 during the forward movement of the vehicle body, and which is a detection pressure value P of the pressure sensor 71 on the side of the other pipe 402 during the backward movement of the vehicle body) may be used.

<Configuration of Controller 5>

Next, a configuration of the controller 5 will be described with reference to FIG. 5 to FIG. 7.

Figure 5:
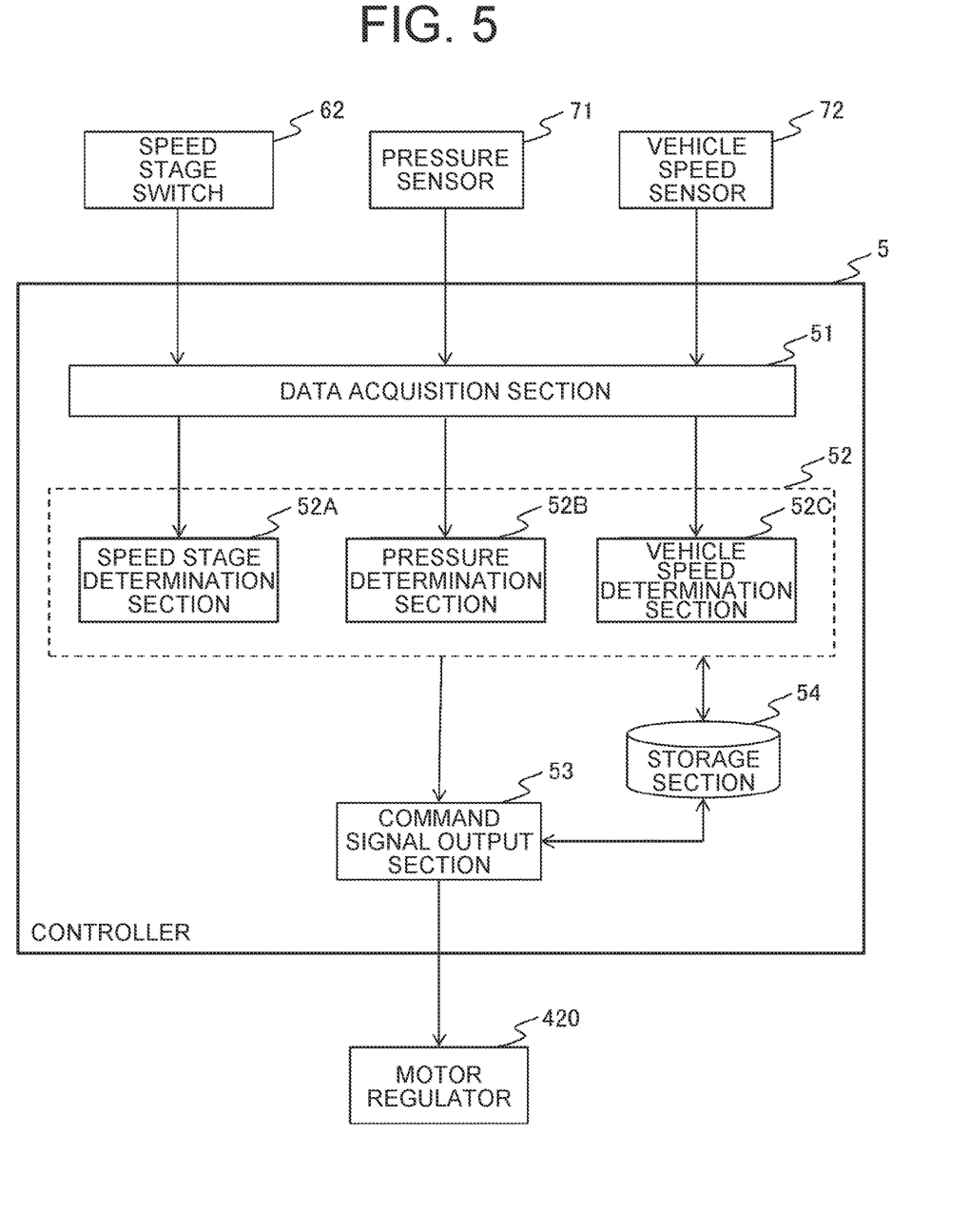
FIG. 5 is a functional block diagram illustrating functions of the controller.

FIG. 5 is a functional block diagram illustrating functions of the controller 5. FIG. 6 illustrates a graph showing the relation between the load pressure P of the HST motor 42 and the displacement volume q of the HST motor 42. FIG. 7 illustrates a graph showing the relation between the maximum vehicle speed Vmax and the minimum displacement volume qmin of the HST motor 42.

The controller 5 is configured such that a CPU, a RAM, a ROM, an HDD, an input I/F, and an output I/F are connected to each other via a bus. Then, various operation devices such as the accelerator pedal 61, the speed stage switch 62, and the forward and backward movement changeover switch 63, and various sensors such as the pressure sensor 71 and the vehicle speed sensor 72 are connected to the input I/F, and the pump regulator 410, the motor regulator 420, the engine 3 and the like are connected to the output I/F.

In this hardware configuration, the CPU reads out a control program (software) stored in a recording medium such as the ROM, the HDD or an optical disc, and loads and executes the control program on the RAM, whereby the control program and the hardware collaborate to implement the functions of the controller 5.

In the present embodiment, the controller 5 is described as a computer configured by a combination of software and hardware. However, the controller 5 is not limited thereto, and as one of the examples of configurations of other computers, an integrated circuit for implementing the functions of the control program executed on the side of the wheel loader 1 may be used.

As illustrated in FIG. 5, the controller 5 includes a data acquisition section 51, a determination section 52, a command signal output section 53, a storage section 54.

The data acquisition section 51 is configured to acquire data relating to a speed stage signal output from the speed stage switch 62, a detection pressure value P detected by the pressure sensor 71, and a detection vehicle speed value V detected by the vehicle speed sensor 72.

The determination section 52 includes a speed stage determination section 52A, a pressure determination section 52B, and a vehicle speed determination section 52C. The speed stage determination section 52A is configured to determine whether a speed stage selected by the speed stage switch 62 is a high speed stage (third speed stage or fourth speed stage) based on the speed stage signal acquired by the data acquisition section 51.

The pressure determination section 52B is configured to determine whether the detection pressure value P acquired by the data acquisition section 51 is more than or less than a pressure value Ps corresponding to a switching point on which the displacement volume of the HST motor 42 is switched from the maximum value qmax to the minimum value qmin or from the minimum value qmin to the maximum value qmax (hereinafter, simply referred to as "switching pressure value Ps"). The vehicle speed determination section 52C is configured to determine whether the detection vehicle speed value V acquired by the data acquisition section 51 is more than or less than the maximum vehicle speed specification value Vmaxs.

Figure 6:
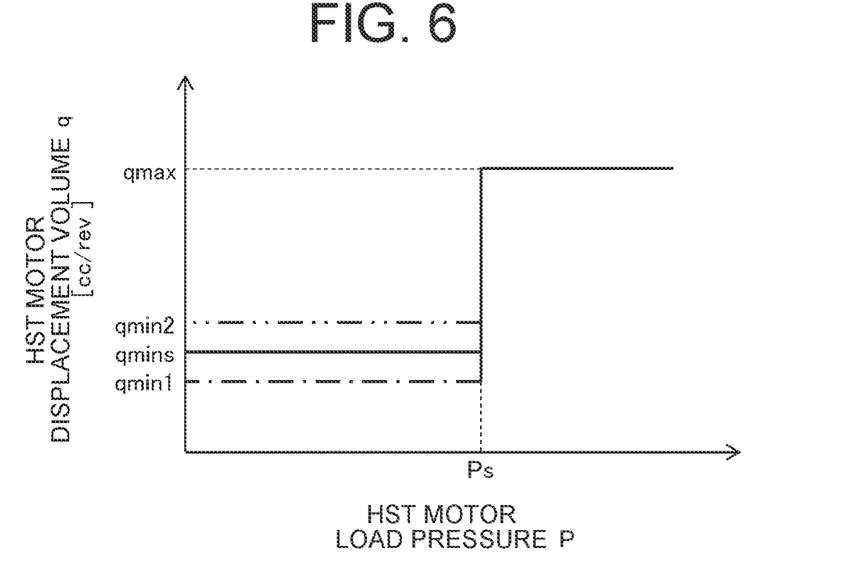
FIG. 6 illustrates a graph showing the relation between the load pressure of an HST motor and the displacement volume of the HST motor.

The command signal output section 53 is configured to output, to the motor regulator 420, a command signal for limiting the minimum displacement volume qmin of the HST motor 42 toward a first minimum displacement volume value qmin1(<qmins) that is less than the minimum displacement volume specification value qmins as illustrated by a dashed and dotted line in FIG. 6, in the case where the speed stage determination section 52A determines that the high speed stage is selected, the pressure determination section 52B determines that the detection pressure value P is equal to or less than the switching pressure value Ps (P≤Ps), and the vehicle speed determination section 52C determines that the detection vehicle speed value V is less than the maximum vehicle speed specification value Vmaxs (V<Vmaxs).

Figure 7:
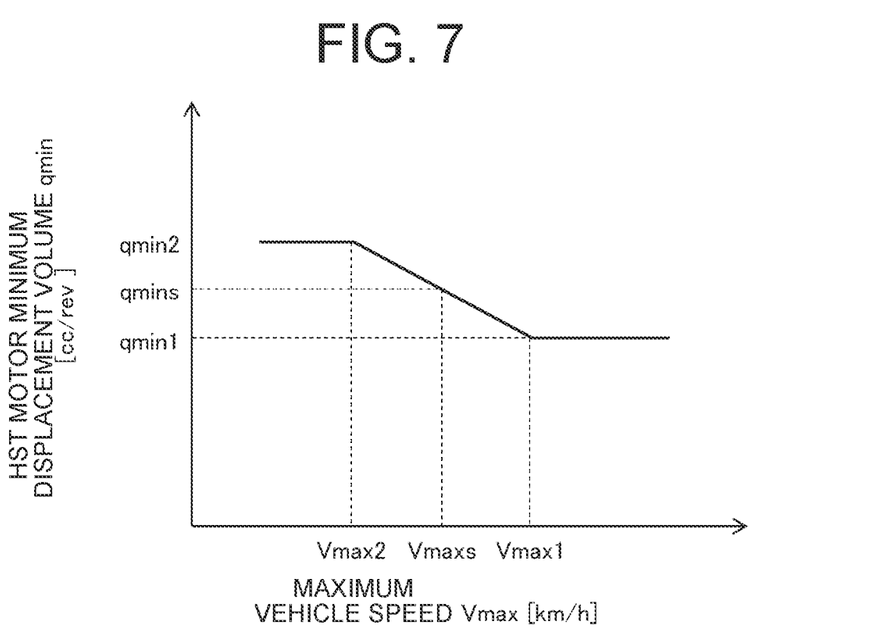
FIG. 7 illustrates a graph showing the relation between the maximum vehicle speed and the minimum displacement volume of the HST motor.

The minimum displacement volume qmin of the HST motor 42 is limited toward the first minimum displacement volume value qmin1 that is less than the minimum displacement volume specification value qmins, and thus the rotational speed N of the HST motor 42 increases, thereby, as illustrated in FIG. 7, causing the vehicle body to attain a first maximum vehicle speed Vmax1 that is more than the maximum vehicle speed specification value Vmaxs. Therefore, even in the case of having attaining the vehicle speed that is less than the maximum vehicle speed specification value Vmaxs due to, for example, deterioration over time of the HST motor 42, the vehicle body can attain the maximum vehicle speed specification value Vmaxs by increasing the vehicle speed toward the first maximum vehicle speed Vmax1.

Furthermore, the command signal output section 53 is configured to output, to the motor regulator 420, a command signal for controlling the minimum displacement volume qmin of the HST motor 42 toward a second minimum displacement volume value qmin2 that is more than the minimum displacement volume specification value qmins as illustrated by a dashed and double dotted line in FIG. 6, in the case where the speed stage determination section 52A determines that the high speed stage is selected, the pressure determination section 52B determines that the detection pressure value P is equal to or less than the switching pressure value Ps (P≤Ps), and the vehicle speed determination section 52C determines that the detection vehicle speed value V is more than the maximum vehicle speed specification value Vmaxs (V>Vmaxs).

In the state where the minimum displacement volume qmin of the HST motor 42 remains limited to the first minimum displacement volume qmin1, there is a possibility that the vehicle speed V increases to a value that significantly exceeds the maximum vehicle speed specification value Vmaxs (overrunning condition). For example, in countries where vehicle inspection systems are established for vehicles traveling on public roads, regulations are imposed on the fact that the upper limit vehicle speed during flat ground traveling of a vehicle exceeds the upper limit vehicle speed specification value. Therefore, in designing the wheel loader 1, it is required to configure the upper limit vehicle speed during the actual traveling on the flat ground to be equal to or less than the upper limit vehicle speed specification value.

With this regard, in the case where the detection vehicle speed value V is more than the maximum vehicle speed specification value Vmaxs (V>Vmaxs), by controlling the minimum displacement volume qmin of the HST motor 42 toward the second minimum displacement volume value qmin2 that is more than the minimum displacement volume specification value qmins to reduce the rotational speed N of the HST motor 42, as illustrated in FIG. 7, it is possible to decelerate the vehicle body toward a second maximum vehicle speed Vmax2 that is less than the maximum vehicle speed specification value Vmaxs, and maintain the vehicle speed at the maximum vehicle speed specification value Vmaxs.

Thus, the controller 5 constantly corrects the vehicle speed V between the second maximum vehicle speed Vmax2 and the first maximum vehicle speed Vmax1 so as to maintain the maximum vehicle speed Vmax of the wheel loader 1 at the maximum vehicle speed specification value Vmaxs, and suppress (stabilize) variations in the maximum vehicle speed Vmax.

In the present embodiment, as illustrated in FIG. 7, the controller 5 varies the minimum displacement volume qmin of the HST motor 42 in proportion to the detection vehicle speed value V between the first minimum displacement volume value qmin1 and the second minimum displacement volume value qmin2. Thus, the vehicle speed change becomes smoother as compared with the case of changing ON/OFF of the minimum displacement volume qmin of the HST motor 42 between the first minimum displacement volume value qmin1 and the second minimum displacement volume value qmin2, thereby eliminating the discomfort caused by the vehicle speed correction performed by the controller 5.

The storage section 54 is a memory, and is configured to store the switching pressure value Ps, the maximum vehicle speed specification value Vmaxs, and the relation between the maximum vehicle speed Vmax and the minimum displacement volume qmin of the HST motor 42 illustrated in FIG. 7, respectively.

<Processing in Controller 5>

Next, a specific flow of the processing executed in the controller 5 will be described with reference to FIG. 8.

Figure 8:
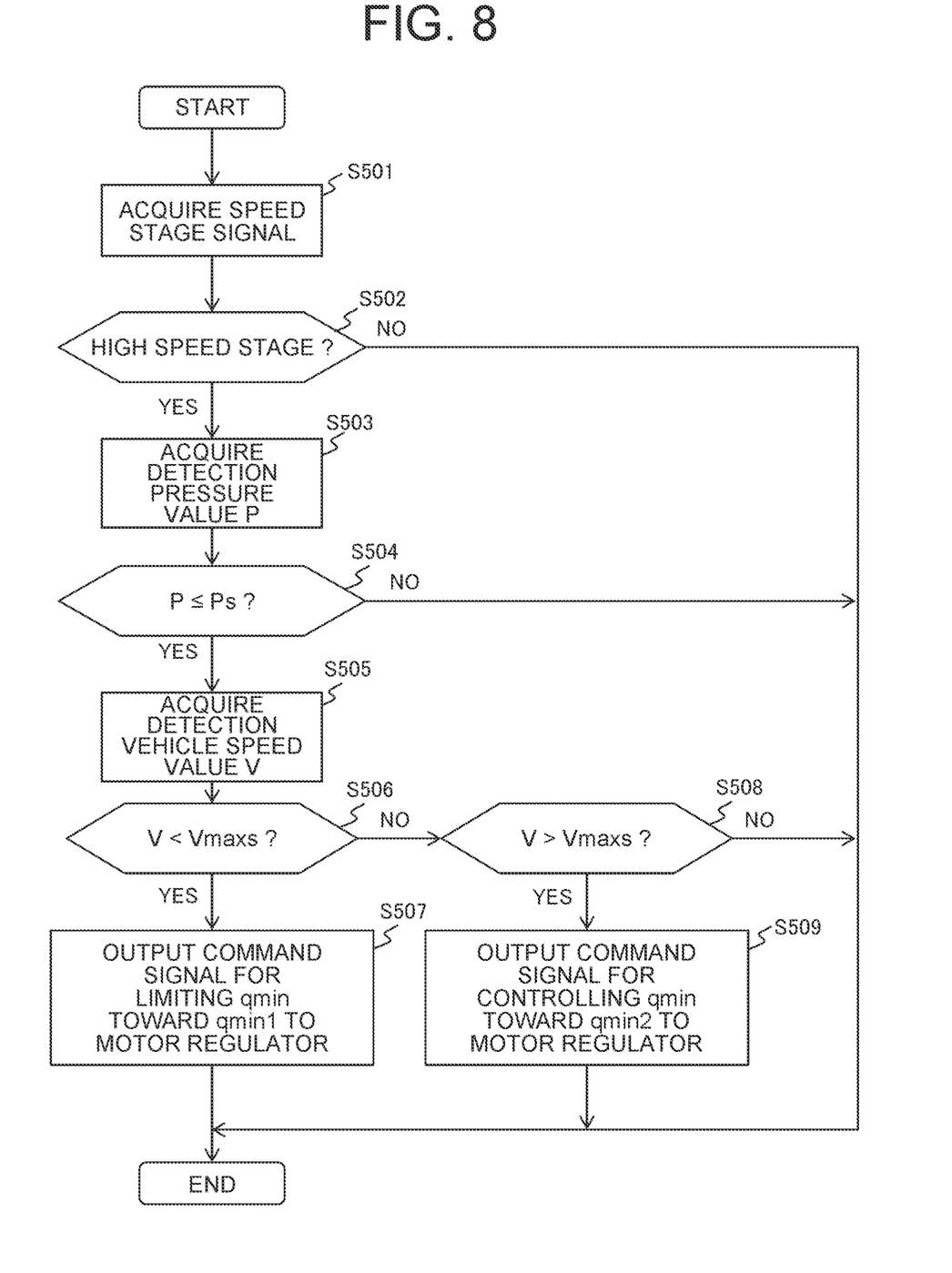
FIG. 8 is a flowchart illustrating a flow of processing executed by the controller.

FIG. 8 is a flowchart illustrating a flow of the processing executed by the controller 5.

Firstly, the data acquisition section 51 acquires a speed stage signal output from the speed stage switch 62 (step S501). Subsequently, the speed stage determination section 52A determines whether the speed stage signal acquired in step S501 is a speed stage signal relating to the high speed stages (step S502).

When it is determined in step S502 that the speed stage signal is the speed stage signal relating to the high speed stages (step S502/YES), the data acquisition section 51 acquires a pressure value P detected by the pressure sensor 71 (step S503). Subsequently, the pressure determination section 52B determines whether the detection pressure value P acquired in step S503 is equal to or less than the switching pressure value Ps (step S504).

When it is determined in step S504 that the detection pressure value P is equal to or less than the switching pressure value Ps (P≤Ps) (step S504/YES), the data acquisition section 51 acquires a vehicle speed value V detected by the vehicle speed sensor 72 (step S505). Subsequently, the vehicle speed determination section 52C determines whether the detection vehicle speed value V acquired in step S505 is less than the maximum vehicle speed specification value Vmaxs (step S506).

When it is determined in step S506 that the detection vehicle speed value V is less than the maximum vehicle speed specification value Vmaxs (V<Vmaxs) (step S506/YES), the command signal output section 53 outputs, to the motor regulator 420, a command signal for limiting the minimum displacement volume qmin of the HST motor 42 toward the first minimum displacement volume qmin1 (step S507), the processing in the controller 5 is ended.

On the other hand, when it is determined in step S506 that the detection vehicle speed value V is equal to or more than the maximum vehicle speed specification value Vmaxs (V≥Vmaxs) (step S506/NO), the vehicle speed determination section 52C determines whether the detection vehicle speed value V is more than the maximum vehicle speed specification value Vmaxs (step S508).

When it is determined in step S508 that the detection vehicle speed value V is more than the maximum vehicle speed specification value Vmaxs (V>Vmaxs) (step S508/YES), the command signal output section 53 outputs, to the motor regulator 420, a command signal for controlling the minimum displacement volume qmin of the HST motor 42 toward the second minimum displacement volume qmin2 (step S509), and the processing in the controller 5 is ended.

In the present embodiment, when it is determined in step S502 that the speed stage signal is not the speed stage signal relating to the high speed stages, that is, it is determined that the speed stage signal is a speed stage signal relating to the low speed stages (step S502/NO), the processing in the controller 5 is ended. Since the case where the wheel loader 1 travels at the maximum vehicle speed Vmax corresponds to the state where the high speed stage to be selected during the flat ground traveling is being selected, the state where the high speed stage is selected by the speed stage switch 62 is set as one of the conditions for the processing.

Furthermore, when it is determined in step S504 that the detection pressure value P is more than the switching pressure value Ps (P>Ps) (step S504/NO), the displacement volume q of the HST motor 42 has been already controlled to the maximum displacement volume qmax, which represents a state where the vehicle speed V has not reached the maximum vehicle speed Vmax yet. Accordingly, the processing in the controller 5 is ended.

Furthermore, when it is determined in step S508 that the detection vehicle speed value V is not more than the maximum vehicle speed specification value Vmaxs, that is, the detection vehicle speed value V is the maximum vehicle speed specification value Vmaxs (V=Vmaxs) (step S508/NO), the vehicle speed V need not be corrected by the controller 5, and thus the processing in the controller 5 is ended.

In the above, the embodiment of the present invention has been descried. The present invention is not limited to the embodiment described above, and includes various modifications. For example, the embodiment described above has been explained in detail in order to clarify the present invention, but is not necessarily limited to the one having all the configurations described. In addition, a part of the configuration of the present embodiment can be replaced with that of other embodiments, and the configuration of other embodiments can be added to the configuration of the present embodiment. Furthermore, it is possible to add, delete, or replace another configuration with respect to a part of the configuration of the present embodiment.

For example, in the embodiment above, the wheel loader has been described as an aspect of work vehicles. However, the present invention is not limited thereto, and can be applied to other vehicles such as a forklift and a wheel shovel as long as they are HST driven work vehicles.

Furthermore, the controller 5 may be configured to limit the minimum displacement volume qmin of the HST motor 42 toward the first minimum displacement volume qmin1, at least when a pressure value P detected by the pressure sensor 71 is equal to or less than the switching pressure value Ps (P≤Ps). The conditions relating to the speed stage and the vehicle speed V are not necessarily required for the processing.

REFERENCE SIGNS LIST

1: wheel loader (work vehicle)
3: engine
5: controller
11, 11A: front wheel (wheel)
11, 11B: rear wheel (wheel)
41: HST pump (traveling hydraulic pump)
42: HST motor (traveling hydraulic motor)
62: speed stage switch (speed stage selection device)
71: pressure sensor
72: vehicle speed sensor
P: detection pressure value
Ps: switching pressure value
qmin: minimum displacement volume
qmins: minimum displacement volume specification value
qmin1: first minimum displacement volume
qmin2: second minimum displacement volume
V: detection vehicle speed value
Vmax: upper limit vehicle speed specification value

The invention claimed is:

1. A work vehicle comprising:
a vehicle body that is provided with a plurality of wheels;
an engine that is mounted on the vehicle body;
a variable displacement traveling hydraulic pump that is driven by the engine;
a variable displacement traveling hydraulic motor that is connected to the traveling hydraulic pump through a closed-circuit and transmits a driving force of the engine to the plurality of wheels; and
a controller configured to control the traveling hydraulic motor,
wherein
the work vehicle comprises:
a pressure sensor configured to detect a load pressure of the traveling hydraulic motor; and
a vehicle speed sensor configured to detect a vehicle speed, and
the controller is configured to, in a case where a detection pressure value detected by the pressure sensor is equal to or less than a switching pressure value corresponding to a switching point in the traveling hydraulic motor between a maximum displacement volume and a minimum displacement volume, and the detection vehicle speed value detected by the vehicle speed sensor is less than a predetermined upper limit vehicle speed during flat ground traveling of the vehicle body, limit the minimum displacement volume of the traveling hydraulic motor to a first minimum displacement volume value that is less than a value of the minimum displacement volume of the traveling hydraulic motor which is associated with the upper limit vehicle speed.

2. The work vehicle according to claim 1, wherein
the controller is configured to, in a range where the detection pressure value is equal to or less than the switching pressure value, and in the case where the detection vehicle speed value is more than the upper limit vehicle speed, control the minimum displacement volume of the traveling hydraulic motor to a second minimum displacement volume value that is more than the value of the minimum displacement volume of the traveling hydraulic motor which is associated with the upper limit vehicle speed.

3. The work vehicle according to claim 2, wherein
the controller is configured to vary the minimum displacement volume of the traveling hydraulic motor in proportion to the detection vehicle speed value between the first minimum displacement volume value and the second minimum displacement volume value.

4. The work vehicle according to claim 1, further comprising a speed stage selection device for selecting a speed stage of the vehicle body,
wherein
the controller is configured to, in a state where a high speed stage including a maximum speed stage is selected by the speed stage selection device, in a case where the detection pressure value is equal to or less than the switching pressure value, limit the minimum displacement volume of the traveling hydraulic motor to the first minimum displacement volume value.

* * * * *